(12) United States Patent
Damnjanovic et al.

(10) Patent No.: US 8,848,618 B2
(45) Date of Patent: Sep. 30, 2014

(54) SEMI-PERSISTENT SCHEDULING FOR TRAFFIC SPURTS IN WIRELESS COMMUNICATION

(75) Inventors: Aleksandar Damnjanovic, Del Mar, CA (US); Adel Aziz, Lausanne (CH); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 11/841,798

(22) Filed: Aug. 20, 2007

(65) Prior Publication Data

US 2008/0117891 A1 May 22, 2008

Related U.S. Application Data

(60) Provisional application No. 60/839,466, filed on Aug. 22, 2006.

(51) Int. Cl.
  *H04W 4/00* (2009.01)
  *H04L 12/28* (2006.01)
  *H04W 72/04* (2009.01)

(52) U.S. Cl.
  CPC .................................... *H04W 72/04* (2013.01)
  USPC .......................... 370/329; 370/395.4; 370/341

(58) Field of Classification Search
  USPC .............. 370/310, 328, 338, 395.4, 431, 437, 370/464, 465, 468
  See application file for complete search history.

(56) References Cited

U.S. PATENT DOCUMENTS

| | | | |
|---|---|---|---|
| 5,708,656 A * | 1/1998 | Noneman et al. | 370/335 |
| 6,452,941 B1 * | 9/2002 | Bruhn | 370/468 |
| 6,636,488 B1 * | 10/2003 | Varma | 370/278 |
| 7,068,623 B1 | 6/2006 | Barany et al. | |
| 7,203,638 B2 * | 4/2007 | Jelinek et al. | 704/201 |
| 7,383,045 B2 * | 6/2008 | Tamura et al. | 455/433 |
| 7,586,949 B1 * | 9/2009 | Barany et al. | 370/474 |

(Continued)

FOREIGN PATENT DOCUMENTS

| | | |
|---|---|---|
| GB | 2313259 | 11/1997 |
| JP | 2000013852 A | 1/2000 |

(Continued)

OTHER PUBLICATIONS

International Search Report—PCT/US07/076588, International Search Report—European Patent Office—Mar. 26, 2008.

(Continued)

*Primary Examiner* — Warner Wong
(74) *Attorney, Agent, or Firm* — John J. Ketchum

(57) ABSTRACT

Techniques for efficiently assigning resources for spurts of traffic in a wireless communication system are described. The system may support semi-persistent and non-persistent resource assignments. A semi-persistent resource assignment is valid for as long as more data is sent within a predetermined time period of last sent data and expires if no data is sent within the predetermined time period. A non-persistent resource assignment is valid for a predetermined duration or a specific transmission. A semi-persistent resource assignment may be granted for an expected spurt of data to send via the communication link. For Voice-over-Internet Protocol (VoIP), a semi-persistent resource assignment may be granted for a voice frame in anticipation of a spurt of voice activity, and a non-persistent resource assignment may be granted for a silence descriptor (SID) frame during a period of silence.

67 Claims, 7 Drawing Sheets

(56) References Cited

U.S. PATENT DOCUMENTS

| | | | |
|---|---|---|---|
| 8,315,210 B2* | 11/2012 | Baker et al. | 370/329 |
| 2002/0086692 A1* | 7/2002 | Chheda et al. | 455/522 |
| 2003/0035423 A1* | 2/2003 | Beckmann et al. | 370/390 |
| 2003/0060207 A1* | 3/2003 | Sugaya et al. | 455/450 |
| 2003/0153370 A1 | 8/2003 | Sako | |
| 2003/0189951 A1* | 10/2003 | Bi et al. | 370/503 |
| 2004/0180675 A1 | 9/2004 | Choi et al. | |
| 2005/0032551 A1 | 2/2005 | Lee et al. | |
| 2005/0122960 A1* | 6/2005 | Khan | 370/352 |
| 2006/0056322 A1* | 3/2006 | Simpson et al. | 370/278 |
| 2006/0067253 A1* | 3/2006 | Gummalla et al. | 370/278 |
| 2006/0092869 A1* | 5/2006 | Herrmann | 370/314 |
| 2006/0171419 A1* | 8/2006 | Spindola et al. | 370/477 |
| 2006/0203821 A1* | 9/2006 | Mizusawa et al. | 370/392 |
| 2007/0019600 A1* | 1/2007 | Zhang | 370/338 |
| 2007/0140463 A1 | 6/2007 | Murata | |
| 2007/0211620 A1* | 9/2007 | McBeath et al. | 370/209 |
| 2009/0296667 A1* | 12/2009 | Tajima et al. | 370/336 |
| 2010/0067457 A1* | 3/2010 | Wang et al. | 370/329 |
| 2010/0150091 A1* | 6/2010 | Yu et al. | 370/329 |

FOREIGN PATENT DOCUMENTS

| | | |
|---|---|---|
| JP | 2000236337 A | 8/2000 |
| JP | 2002507342 A | 3/2002 |
| JP | 2002525911 A | 8/2002 |
| JP | 2003060564 A | 2/2003 |
| JP | 2003244057 A | 8/2003 |
| JP | 2004187279 A | 7/2004 |
| JP | 2008521276 A | 6/2008 |
| RU | 2222107 | 1/2004 |
| WO | 9857509 | 12/1998 |
| WO | 0016513 | 3/2000 |
| WO | WO03090390 | 10/2003 |
| WO | 2006052118 | 5/2006 |

OTHER PUBLICATIONS

Written Opinion—PCT/US07/076588, International Search Authority, European Patent Office, Mar. 26, 2008.

Taiwanese Search report—096131113—TIPO—Dec. 12, 2010.

Qualcomm Europe, Considerations for control signaling support of Real Time Services,3GPP TSG-RAN WG1 LTE Ad Hoc, Jan. 23, 2006, R1-060173,URL, http://www.3gpp.org/ftp/tsg_ran/wg1_rl1/TSGR1_AH/LTE_AH_January-06/Docs/R1-060173.zip. 060173.zip.

* cited by examiner

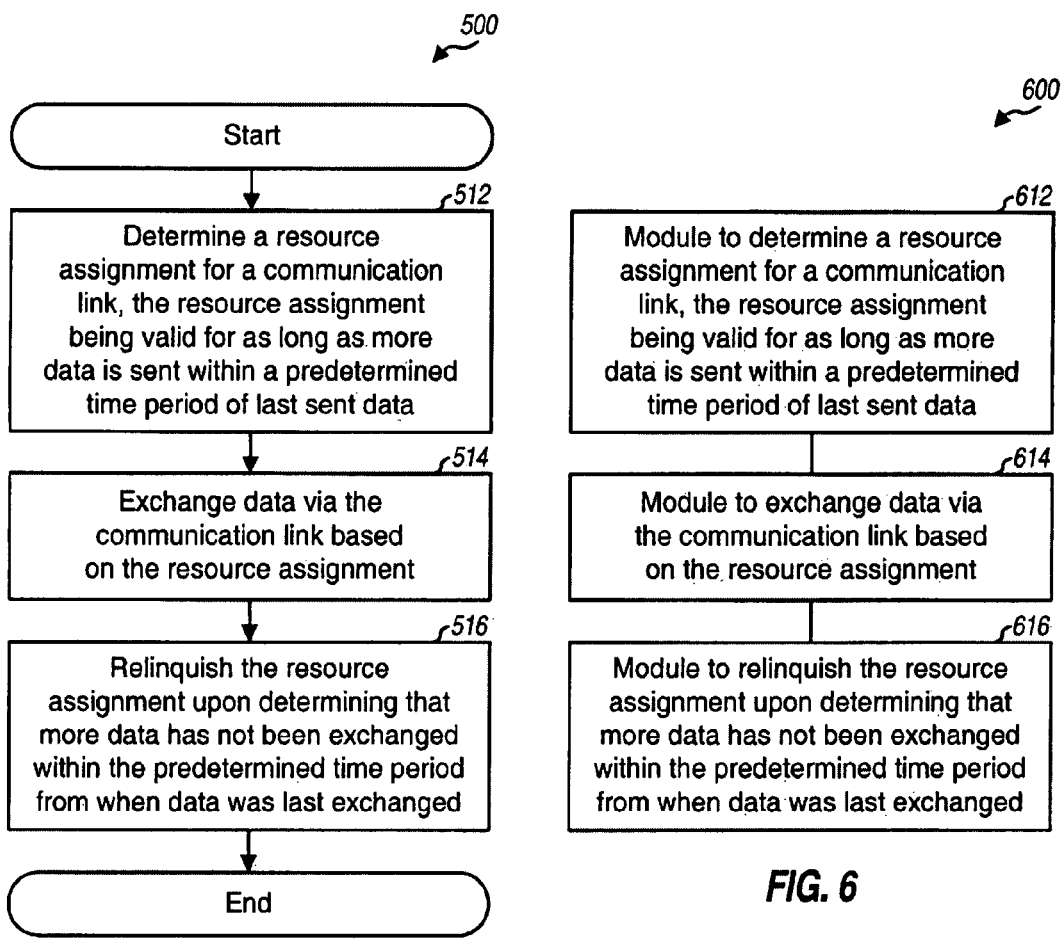

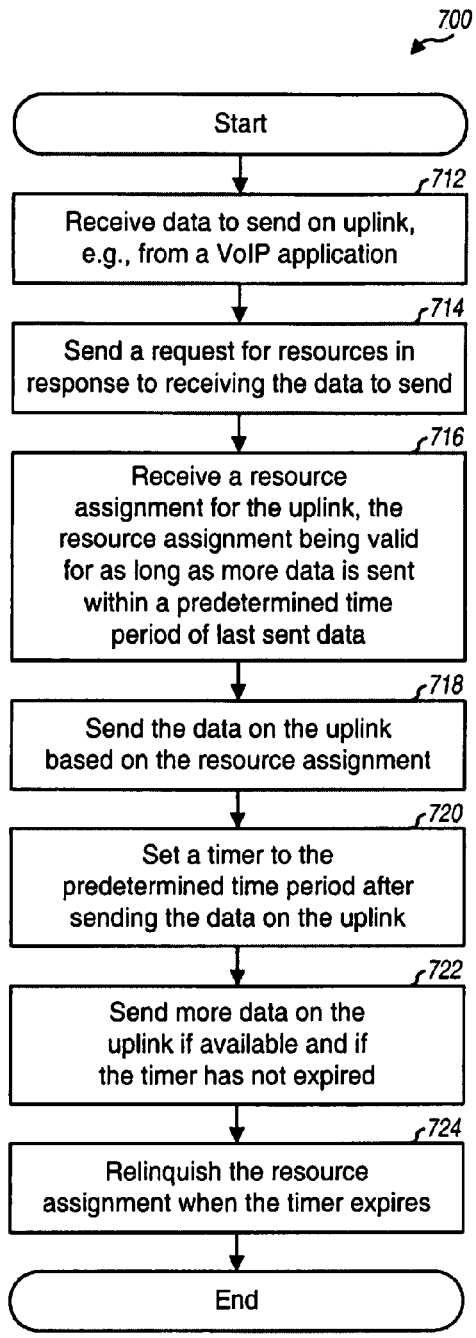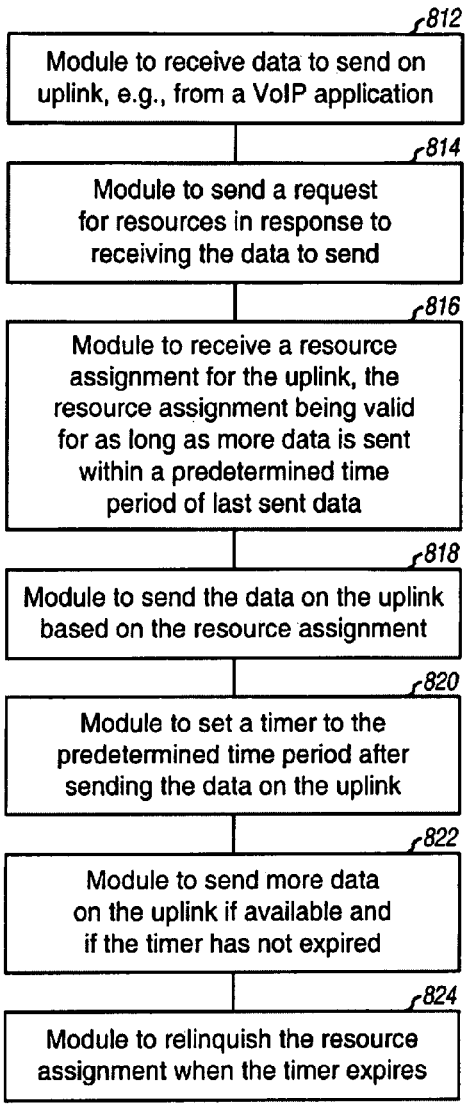
FIG. 7
FIG. 8

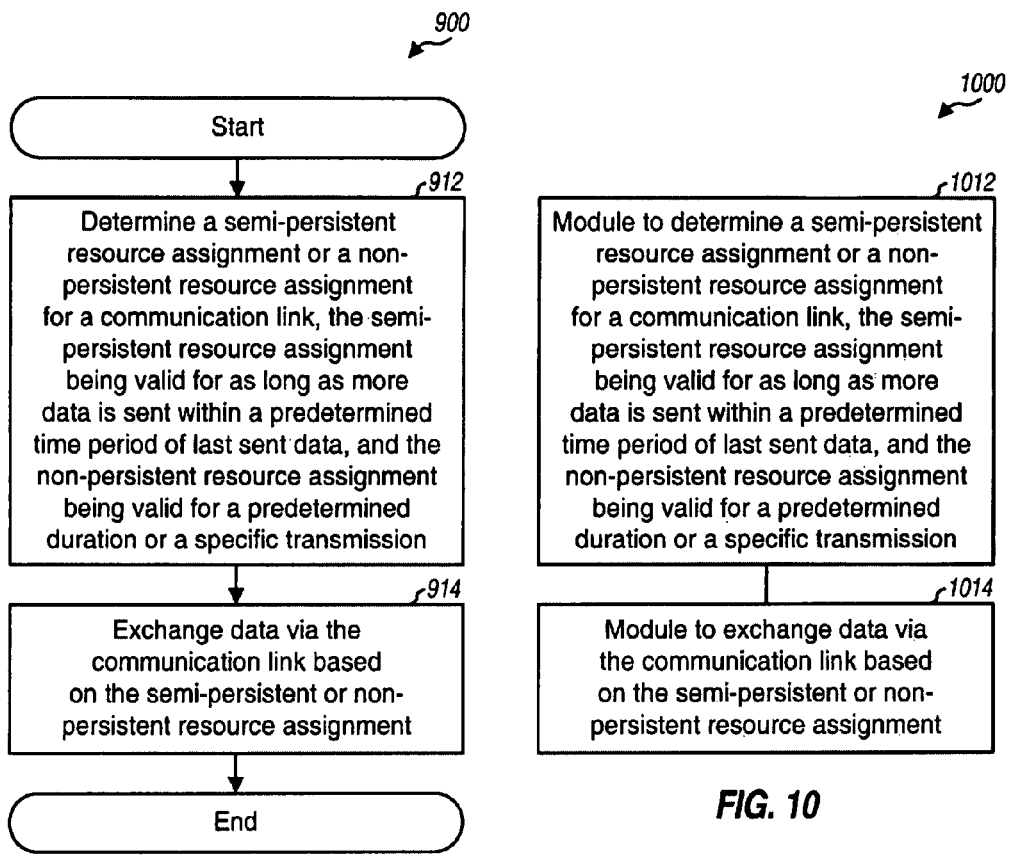

SEMI-PERSISTENT SCHEDULING FOR TRAFFIC SPURTS IN WIRELESS COMMUNICATION

The present application claims priority to provisional U.S. Application Ser. No. 60/839,466, entitled "A METHOD AND APPARATUS FOR VOIP SCHEDULING," filed Aug. 22, 2006, assigned to the assignee hereof and incorporated herein by reference.

BACKGROUND

I. Field

The present disclosure relates generally to communication, and more specifically to scheduling techniques for wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). Each UE may communicate with one or more base stations via transmissions on the downlink and uplink. The downlink (or forward link) refers to the communication link from the base stations to the UEs, and the uplink (or reverse link) refers to the communication link from the UEs to the base stations.

The system may utilize a resource assignment scheme in which a UE may request for resources whenever the UE has data to send on the uplink. A base station may process each resource request from the UE and may send a grant of resources to the UE. The UE may then transmit data on the uplink using the granted resources. However, uplink resources are consumed to send requests for resources, and downlink resources are consumed to send grants of resources. There is therefore a need in the art for techniques to support resource assignment with as little overhead as possible in order to improve system capacity.

SUMMARY

Techniques for efficiently assigning resources for spurts of traffic in a wireless communication system are described herein. In an aspect, the system may support different types of resource assignments such as semi-persistent resource assignment and non-persistent resource assignment. A semi-persistent resource assignment is an assignment of resources that is valid for as long as more data is sent within a predetermined time period of last sent data and expires if no data is sent within the predetermined time period. A non-persistent resource assignment is an assignment of resources that is valid for a predetermined duration or a specific transmission.

In one design, a semi-persistent resource assignment or a non-persistent resource assignment for a communication link (e.g., downlink or uplink) may be determined. Data may then be exchanged (e.g., sent and/or received) via the communication link based on the semi-persistent or non-persistent resource assignment. A semi-persistent resource assignment may be granted for an expected spurt of data to send via the communication link. As an example, for Voice-over-Internet Protocol (VoIP), a semi-persistent resource assignment may be granted for a voice frame in anticipation of a spurt of voice activity, and a non-persistent resource assignment may be granted for a silence descriptor (SID) frame during a period of silence.

Various aspects and features of the disclosure are described in further detail below.

BRIEF DESCRIPTION OF THE DRAWINGS

FIGS. 5 and 6 show a process and an apparatus, respectively, for exchanging data with a semi-persistent resource assignment.

FIGS. 7 and 8 show a process and an apparatus, respectively, for sending data on the uplink by the UE.

FIGS. 9 and 10 show a process and an apparatus, respectively, for exchanging data with a semi-persistent or non-persistent resource assignment.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

The techniques described herein may be used for assignment of resources on the downlink as well as the uplink. For clarity, certain aspects of the techniques are described below for assignment of resources on the uplink in LTE. LTE terminology is used in much of the description below.

Figure 1:
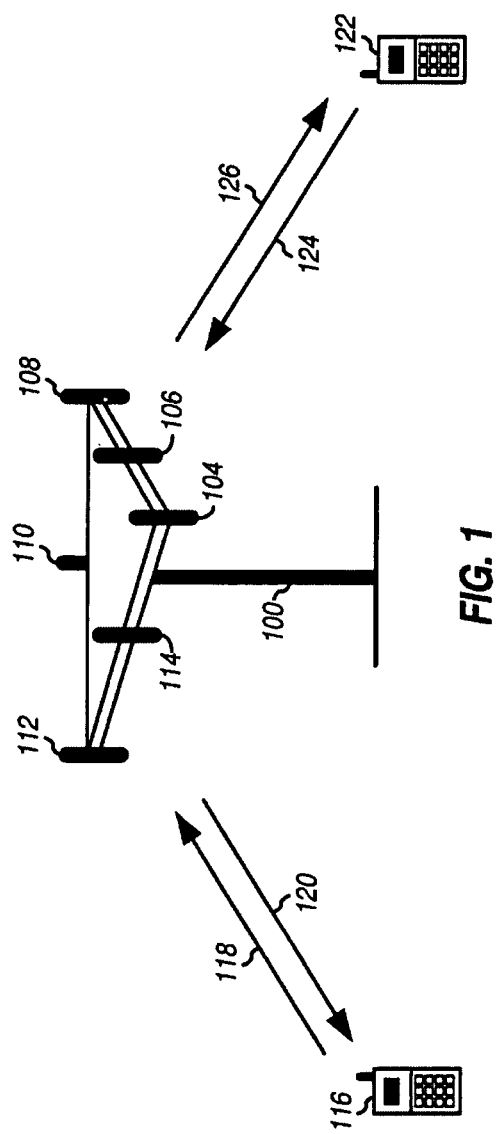
FIG. 1 shows a wireless multiple-access communication system.

FIG. 1 shows a wireless multiple-access communication system according to one design. An evolved Node B (eNB) 100 includes multiple antenna groups, one group including antennas 104 and 106, another group including antennas 108 and 110, and an additional group including antennas 112 and 114. In FIG. 1, only two antennas are shown for each antenna group. However, more or fewer antennas may also be utilized for each antenna group. In general, an eNB may be a fixed station used for communicating with the UEs and may also be referred to as a Node B, a base station, an access point, etc.

A UE 116 is in communication with antennas 112 and 114, where antennas 112 and 114 transmit information to UE 116 via downlink 120 and receive information from UE 116 via uplink 118. A UE 122 is in communication with antennas 106 and 108, where antennas 106 and 108 transmit information to UE 122 via downlink 126 and receive information from UE 122 via uplink 124. In general, a UE may be stationary or mobile and may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. In a frequency division duplex (FDD) system, communication links 118, 120, 124 and 126 may use different frequencies for communication. For example, downlink 120 and 126 may use one frequency, and uplink 118 and 124 may use another frequency.

The overall coverage area of eNB 100 may be partitioned into multiple (e.g., three) smaller areas. These smaller areas may be served by different groups of antennas of eNB 100. In 3GPP, the term "cell" can refer to the smallest coverage area of an eNB and/or an eNB subsystem serving this coverage area. In other systems, the term "sector" can refer to the smallest coverage area and/or the subsystem serving this coverage area. For clarity, 3GPP concept of cell is used in the description below. In one design, the three antenna groups of eNB 100 support communication for UEs in three cells of eNB 100.

Figure 2:
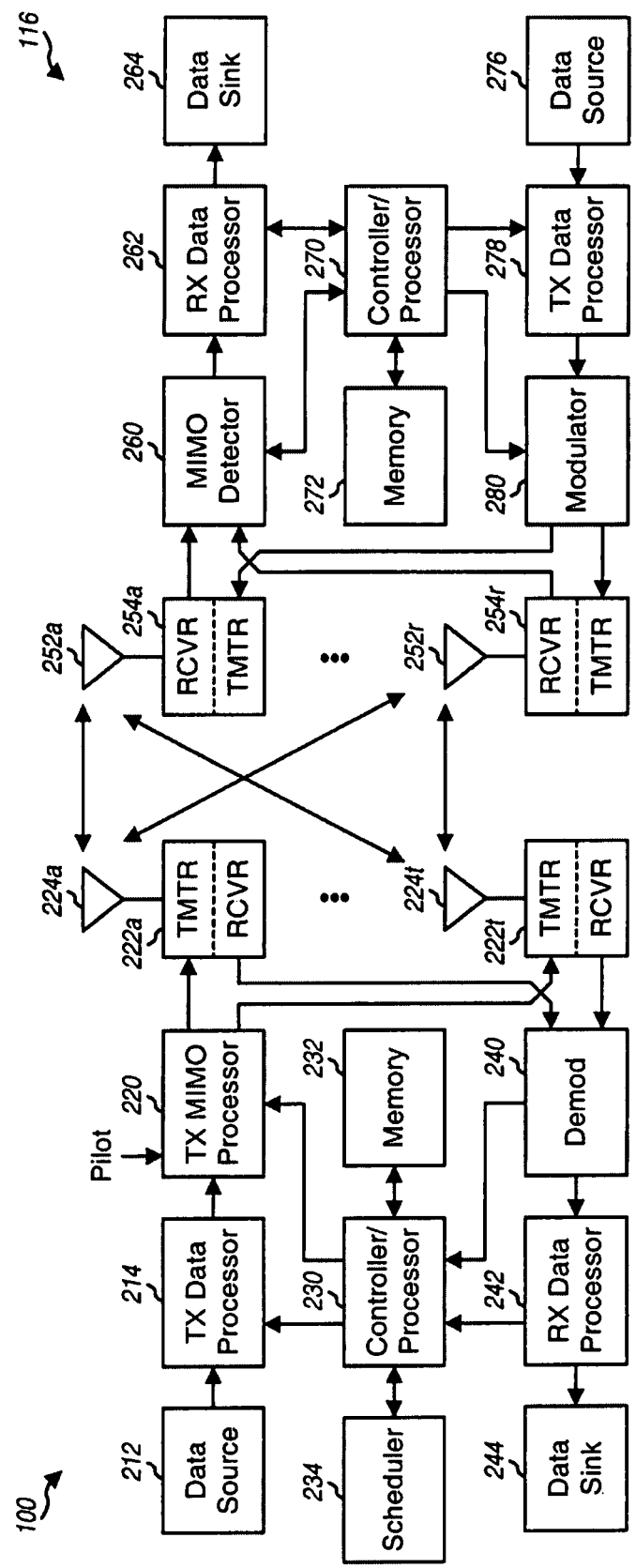
FIG. 2 shows a block diagram of a base station and a UE.

FIG. 2 shows a block diagram of a design of eNB 100 and UE 116. In this design, eNB 100 is equipped with T antennas 224a through 224t, and UE 116 is equipped with R antennas 252a through 252r, where in general T≥1 and R≥1.

At eNB 100, a transmit (TX) data processor 214 may receive traffic data for one or more UEs from a data source 212. TX data processor 214 may process (e.g., format, encode, and interleave) the traffic data for each UE based on one or more coding schemes selected for that UE to obtain coded data. TX data processor 214 may then modulate (or symbol map) the coded data for each UE based on one or more modulation schemes (e.g., BPSK, QSPK, M-PSK or M-QAM) selected for that UE to obtain modulation symbols.

A TX MIMO processor 220 may multiplex the modulation symbols for all UEs with pilot symbols using any multiplexing scheme. Pilot is typically known data that is processed in a known manner and may be used by a receiver for channel estimation and other purposes. TX MIMO processor 220 may process (e.g., precode) the multiplexed modulation symbols and pilot symbols and provide T output symbol streams to T transmitters (TMTR) 222a through 222t. In certain designs, TX MIMO processor 220 may apply beamforming weights to the modulation symbols to spatially steer these symbols. Each transmitter 222 may process a respective output symbol stream, e.g., for orthogonal frequency division multiplexing (OFDM), to obtain an output chip stream. Each transmitter 222 may further process (e.g., convert to analog, amplify, filter, and upconvert) the output chip stream to obtain a downlink signal. T downlink signals from transmitters 222a through 222t may be transmitted via T antennas 224a through 224t, respectively.

At UE 116, antennas 252a through 252r may receive the downlink signals from eNB 100 and provide received signals to receivers (RCVR) 254a through 254r, respectively. Each receiver 254 may condition (e.g., filter, amplify, downconvert, and digitize) a respective received signal to obtain samples and may further process the samples (e.g., for OFDM) to obtain received symbols. A MIMO detector 260 may receive and process the received symbols from all R receivers 254a through 254r based on a MIMO receiver processing technique to obtain detected symbols, which are estimates of the modulation symbols transmitted by eNB 100. A receive (RX) data processor 262 may then process (e.g., demodulate, deinterleave, and decode) the detected symbols and provide decoded data for UE 116 to a data sink 264. In general, the processing by MIMO detector 260 and RX data processor 262 is complementary to the processing by TX MIMO processor 220 and TX data processor 214 at eNB 100.

On the uplink, at UE 116, traffic data from a data source 276 and signaling messages may be processed by a TX data processor 278, further processed by a modulator 280, conditioned by transmitters 254a through 254r, and transmitted to eNB 100. At eNB 100, the uplink signals from UE 116 may be received by antennas 224, conditioned by receivers 222, demodulated by a demodulator 240, and processed by an RX data processor 242 to obtain the traffic data and messages transmitted by UE 116.

Controllers/processors 230 and 270 may direct the operations at eNB 100 and UE 116, respectively. Memories 232 and 272 may store data and program codes for eNB 100 and UE 116, respectively. A scheduler 234 may schedule UEs for downlink and/or uplink transmission and may provide assignments of resources for the scheduled UEs.

The system may support hybrid automatic retransmission (HARQ) in order to improve reliability of data transmission. For HARQ, a transmitter may send a transmission for a data frame and may send one or more retransmissions if needed until the data frame is decoded correctly by a receivers or the maximum number of retransmissions has been sent, or some other termination condition is encountered. A data frame may also be referred to as a packet, a data unit, a data block, etc.

Figure 3:
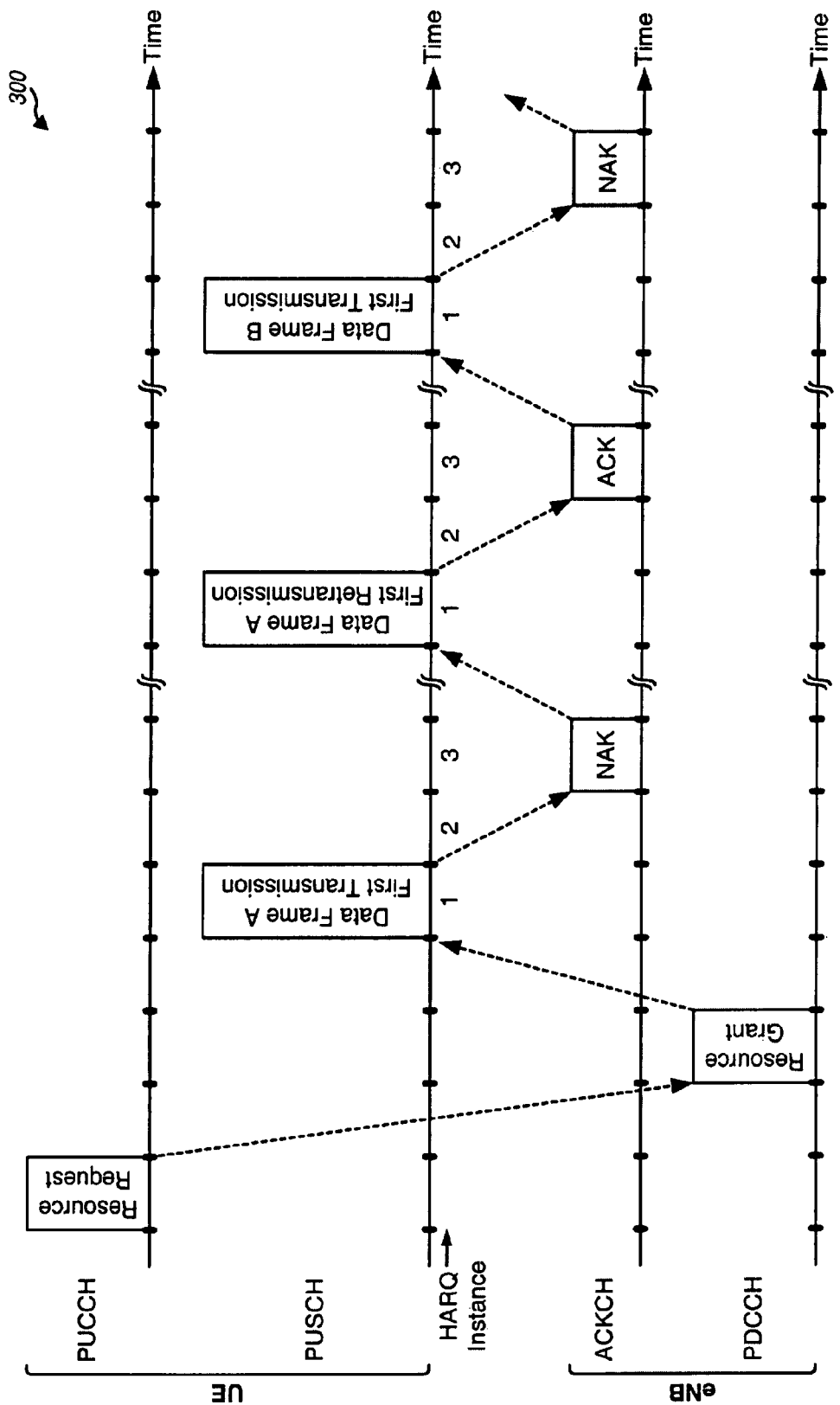
FIG. 3 shows data transmission on the uplink with HARQ.

FIG. 3 shows an example data transmission on the uplink with HARQ in LTE. UE 116 may have data to send on the uplink and may transmit a request for uplink resources on a Physical Uplink Control Channel (PUCCH). eNB 100 may receive the resource request from UE 116 and may return a grant of uplink resources on a Physical Downlink Control Channel (PDCCH). UE 116 may process data frame A and transmit this frame using the granted reverse link resources on a Physical Uplink Shared Channel (PUSCH). The frame transmission may span one subframe, which may be 2 millisecond (ms) in LTE but may also be of other duration such as 1 ms, 5 ms, 10 ms, etc. A subframe may also be referred to as a transmission time interval (TTI). eNB 100 may receive the transmission for frame A, decode frame A in error, and send a negative acknowledgement (NAK) on an acknowledgement channel (ACKCH). UE 116 may receive the NAK and retransmit frame A. eNB 100 may receive the retransmission for frame A, decode frame A correctly based on the original transmission and the retransmission, and send an acknowledgement (ACK). UE 116 may receive the ACK and process and transmit the next data frame B in similar manner as frame A.

Each transmission and each retransmission of a data frame may be referred to as an HARQ transmission. The number of HARQ transmissions for the data frame may be dependent on the modulation and coding scheme (MCS) used for the data frame, the received signal quality for the data frame, etc. An MCS may also be referred to as a rate, a frame format, a packet format, a transport format, etc. The MCS for the data frame may be selected to achieve a target HARQ termination, which is the expected number of HARQ transmissions needed to correctly decode the data frame. A longer target HARQ termination may improve resource utilization efficiency at the expense of longer delay.

Q HARQ instances or interlaces may be defined, where Q may be any integer value. Each HARQ instance may include subframes that are spaced apart by Q subframes. For example, six HARQ instances may be defined, and HARQ instance q may include subframes q, q+6, q+12, etc., for q∈ {0, ..., 5}.

An HARQ process may refer to all transmission and retransmissions, if any, for a data frame. An HARQ process may be started when resources are available and may terminate after the first transmission or after one or more retransmissions. An HARQ process may have a variable duration that may depend on the decoding results at the receiver. Each HARQ process may be sent on one HARQ instance, and up to Q HARQ processes may be sent in parallel on the Q HARQ instances.

UE 116 may send a request for uplink resources whenever the UE has traffic data to send on the uplink. eNB 100 may return a grant of uplink resources to UE 116. UE 116 may receive traffic data to send on the uplink in spurts. These spurts may start any time and may be of any duration. For example, UE 116 may have a VoIP call and may receive spurts of voice data from a talking user. A VoIP application may provide voice frames at one rate (e.g., every 10 or 20 ms) during spurts of voice activity and may provide SID frames at another rate (e.g., every 160 ms) during periods of silence. UE 116 may not know a priori when data frames will be received from the VoIP application for transmission on the uplink. Whenever a data frame (e.g., a voice frame or a SID frame) is received from the VoIP application, UE 116 may send a request for uplink resources to eNB 100, receive a grant of uplink resources from eNB 100, and transmit the data frame using the granted resources. However, transmission of a request on the uplink and a grant on the downlink for each data frame may result in high control channel overhead.

In an aspect, the system may support different types of resource assignments such as those shown in Table 1.

TABLE 1

| Assignment Type | Description |
|---|---|
| Persistent resource assignment | An assignment of resources that is valid for an indefinite period of time until revoked. |
| Semi-persistent resource assignment | An assignment of resources that is valid for as long as more data is sent within a predetermined time period of last sent data and expires automatically if no data is sent within the predetermined time period. |
| Non-persistent resource assignment | An assignment of resources that is valid for a predetermined duration or a specific transmission. |

In general, resources may be quantified by frequency (e.g., a set of subcarriers), time (e.g., symbol periods or subframes), code, transmit power, etc., or any combination thereof. The granted resources in a semi-persistent resource assignment may be referred to as preconfigured resources, predefined resources, pre-assigned resources, etc. The predetermined time period is also referred to as a timeout period.

Semi-persistent and non-persistent resource assignments may be efficiently used for any application with spurts of data. For VoIP, semi-persistent resource assignments may be used for voice frames sent during spurts of voice activity, and non-persistent resource assignments may be used for SID frames sent during silence periods. The semi-persistent resource assignments may provide good performance for voice spurts and may reduce control channel overhead. The non-persistent resource assignments may be suitable for SID frames due to a large time interval between the SID frames, and control channel overhead may be reasonable due to infrequent SID frame arrivals.

UE 116 may send a request for uplink resources on the PUCCH whenever the UE has data to send on the uplink. UE 116 may indicate the amount and/or type of data to send in the resource request. For VoIP, the resource request may indicate whether UE 116 has a voice frame or a SD frame, the size or data rate of the voice frame, etc. In general, different codewords may be used for different data buffer levels or frame rates (e.g., full rate frame, half rate frame, quarter rate frame, SID frame, etc.), different types of frames (e.g., compressed header VoIP frames and uncompressed header VoIP frames), and/or other information indicative of the amount and/or type of data to send. UE 116 may select an appropriate codeword based on its data buffer level and may send the selected codeword for the resource request. In one design, two codewords may be used for VoIP—one codeword for a full rate voice frame and another codeword for a SID frame.

eNB 100 may receive the resource request from UE 116 and may assign appropriate resources based on the request. In one design, eNB 100 may grant (i) a semi-persistent resource assignment for a resource request for a voice frame or (ii) a non-persistent resource assignment for a resource request for a SID frame. In one design, if multiple voice frame rates are supported, then the semi-persistent resource assignment may be for the highest supported voice frame rate, e.g., full rate. This design would allow UE 116 to send voice frames of any supported rate using the semi-persistent resource assignment. In other designs, the semi-persistent resource assignment may be for the most commonly used voice frame rate, the requested voice frame rate, etc.

UE 116 may receive a non-persistent resource assignment from eNB 100 and may use the granted uplink resources for a predetermined duration, which may be sufficient to transmit one SID frame. UE 116 may relinquish the granted uplink resources after the predetermined duration, e.g., after sending the SID frame.

UE 116 may receive a semi-persistent resource assignment from eNB 100 and may retain the granted uplink resources for as long as the UE transmits more data within the timeout period. The timeout period may be a fixed or configurable value and may be selected based on a frame inter-arrival time, which is the expected time interval between consecutive data frames to be sent by UE 116. For VoIP, UE 116 may send voice frames every 10 or 20 ms, and the timeout period may be 40 to 80 ms. UE 116 may use a timer to keep track of the timeout period. UE 116 may start the timer after sending the first voice frame using the granted uplink resources and may restart the timer whenever a subsequent voice frame is sent. UE 116 may relinquish the granted uplink resources and not transmit using these resources when the timer expires.

If the granted uplink resources expire naturally from non-use for the timeout period, then this timeout period determines the amount of time that the granted uplink resources are not used at the end of a data spurt. In order to efficiently utilize the available resources, UE 116 may send signaling to relinquish the granted uplink resources prior to expiration of the timeout period if UE 116 does not expect to use the granted uplink resources. In one design, UE 116 may send a request with no data indication as inband signaling in the expected last data frame for the current data spurt. In another design, UE 116 may send a request with no data indication (e.g., on the PUCCH) if the UE does not transmit data for an idle period. This idle period may be longer than the frame inter-arrival time but shorter than the timeout period. For example, if voice frames are sent every 10 or 20 ms, then the idle period may be around 30 ms, which is longer than the time interval between two voice frames to allow for jitter in voice frame arrivals. UE 116 may send a request with no data indication after the idle period has elapsed since the last transmitted data frame. If HARQ is employed, then UE 116 may be granted uplink resources on one or more HARQ instances. UE 116 may send a separate request with no data indication for each assigned HARQ instance. Alternatively, UE 116 may send a single request with no data indication for all assigned HARQ instances. In any case, the request with no data indication may support fast de-assignment of resources and speed up swapping of resources among UEs. To reduce transmission time, the request with no data indication may be sent with lower modulation and coding and/or higher transmit power level.

In general, a semi-persistent resource assignment may be terminated based on any of the following:

No data is sent within the timeout period,

Explicit signaling sent by the UE to terminate the resource assignment,

Explicit signaling sent by the eNB to terminate the resource assignment, and

Re-assignment of the resources to another UE.

Figure 4:
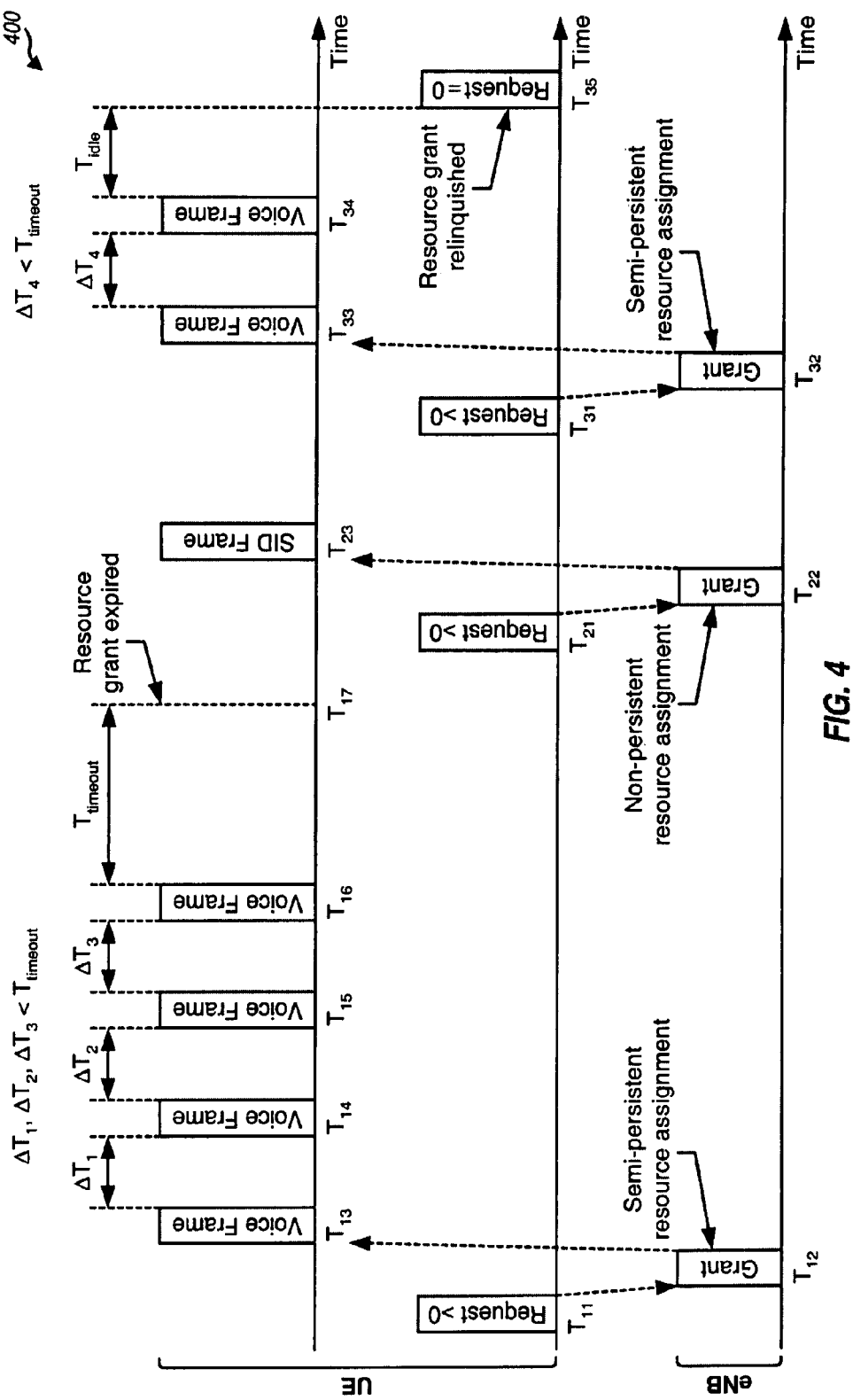
FIG. 4 shows transmissions for VoIP with semi-persistent and non-persistent resource assignments.

FIG. 4 shows example transmissions for VoIP using semi-persistent and non-persistent resource assignments. At time $T_{11}$, UE 116 has voice data to send on the uplink and transmits a request for uplink resources for a full rate frame. At time $T_{12}$, eNB 100 returns a semi-persistent resource assignment with sufficient uplink resources for the full rate frame. At time $T_{13}$, UE 116 transmits the first voice frame using the granted uplink resources. UE 116 transmits additional voice frames at times $T_{14}$, $T_{15}$ and $T_{16}$, with each additional voice frame being sent within the timeout period $T_{timeout}$ of the prior voice frame. A voice frame is not transmitted within the timeout period after time $T_{16}$. At time $T_{17}$, which is the timeout period after time $T_{16}$, the semi-persistent resource assignment expires, and UE 116 relinquishes the granted uplink resources.

At time $T_{21}$, UE 116 has a SID frame to send on the uplink and transmits a request for uplink resources for the SID frame. At time $T_{22}$, eNB 100 returns a non-persistent resource assignment with sufficient uplink resources for the SID frame. At time $T_{23}$, UE 116 transmits the SD frame using the granted uplink resources. The non-persistent resource assignment expires after transmission of the SID frame, and UE 116 relinquishes the granted uplink resources.

At time $T_{31}$, UE 116 has voice data to send and transmits a request for uplink resources for a full rate frame. At time $T_{32}$, eNB 100 returns a semi-persistent resource assignment with sufficient uplink resources for the full rate frame. UE 116 transmits the first voice frame using the granted uplink resources at time $T_{33}$ and transmits an additional voice frame at time $T_{34}$. A voice frame is not sent within the idle period $T_{idle}$ after time $T_{34}$. At time $T_{35}$, which is the idle period after time $T_{34}$, UE 116 transmits a request with no data indication to relinquish the granted uplink resources.

A semi-persistent resource assignment may indicate specific resources that may be used to send data. The granted resources may be given by specific resource blocks in specific subframes. Each resource block may cover a set of subcarriers in a particular time duration, e.g., one subframe. If HARQ is used, then the granted uplink resources may be for one or more specific HARQ instances. The semi-persistent resource assignment may also indicate one or more specific MCSs that may be used to send data. Each MCS may be associated with a specific frame size, a specific coding scheme or code rate, a specific modulation scheme, etc. In any case, both eNB 100 and UE 116 know the resources, and MCSs that may be used to send data.

In one design, UE 116 may send data on the uplink using the granted uplink resources without sending any signaling to inform eNB 100 of data being sent. In this design, eNB 100 may attempt to decode its received transmission on the granted uplink resources in each subframe in which data might be sent by UE 116. eNB 100 may perform blind decoding for each MCS that might be used by UE 116 to send data. In another design, UE 116 may notify eNB 100 of a data frame being sent and possibly the MCS used for the data frame. In this design, eNB 100 may attempt to decode its received transmission only when notified and further based on the MCS (if sent). For both designs, eNB 100 may de-assign the granted uplink resources if the eNB does not correctly decode a data frame from UE 116 within the timeout period. If HARQ is used, then eNB 100 may wait a little longer than the timeout period in order to account for possible ACK/NAK errors prior to de-assigning the granted uplink resources.

In general, the semi-persistent and non-persistent resource assignments may be used with or without HARQ. If HARQ is employed, then the semi-persistent and non-persistent resource assignments may be defined to cover certain aspects of HARQ. In one design, a semi-persistent or non-persistent resource assignment may cover all transmission and retransmissions of a data frame. In another design, a semi-persistent or non-persistent resource assignment may cover only the first transmission of a data frame, and subsequent retransmissions may be scheduled with another assignment. For a semi-persistent resource assignment, the HARQ termination statistic, on average, should finish within the frame inter-arrival time. For example, if data frames are sent every 20 ms, then the average number of HARQ transmissions for each data frame should be less than 20 ms in order to prevent buildup of data in the data buffer. For a resource assignment covering only the first transmission of a data frame, the HARQ termination statistic may be slightly longer than one HARQ transmission (e.g., 1.2 HARQ transmissions) in order to reduce the number of resource requests for retransmissions of the data frame.

The number of HARQ instances and/or the target HARQ termination may be selected to achieve efficient resource utilization. The target HARQ termination may be selected based on the frame inter-arrival time, the interval between consecutive HARQ transmissions, whether a resource assignment covers only the first transmission or all HARQ transmissions, etc. The MCS and code bits to be transmitted may be selected such that maximum coding gain can be achieved for the average number of HARQ transmissions, which is determined by the target HARQ termination. The amount of data that can be sent in one HARQ instance may be dependent on the target HARQ termination (more data may be sent for longer HARQ termination, and vice versa) and other factors. The number of HARQ instances may be configurable and selected based on the total amount of data to send, the amount of data that can be sent on each HARQ instance, etc.

In general, the semi-persistent and non-persistent resource assignments may be used for data transmission on the uplink (as described above) and also for data transmission on the downlink. For the downlink, eNB 100 may send grants of downlink resources on the PDCCH whenever eNB 100 has data to send to UE 116. eNB 100 may send a semi-persistent resource assignment if it has a voice frame to send and may send a non-persistent resource assignment if it has a SID frame to send. The semi-persistent resource assignment may be valid for as long as more data is sent within the timeout period and may expire if data is not sent within the timeout period. The same or different timeout periods may be used for the downlink and uplink. eNB 100 may also explicitly terminate the semi-persistent resource assignment prior to the timeout period by sending signaling to UE 116. Downlink resources may thus be quickly swapped when there is no more data to send to UE 116.

In one design, eNB 100 may send downlink grants at any time, and UE 116 may monitor the PDCCH to determine whether a downlink grant has been sent to the UE. In another design, eNB 100 may send downlink grants in only certain subframes, which may be referred to as reception subframes. UE 116 may monitor the PDCCH only during the reception subframes to determine whether a downlink grant has been sent to the UE. This design may support discontinuous reception (DRX) by UE 116.

For the downlink, a semi-persistent resource assignment may indicate specific downlink resources (e.g., specific resource blocks and specific subframes) in which data might be sent to UE 116. The semi-persistent resource assignment may also indicate one or more specific MCSs that may be used to send data on the granted downlink resources. UE 116 may perform blind decoding on its received transmission based on the preconfigured MCSs in each subframe in which data might be sent to the UE. Alternatively, eNB 100 may signal the MCS used to send data to UE 116, and UE 116 may decode its received transmission based on the signaled MCS.

For the downlink, eNB 100 may send data to UE 116 using a Cell Radio Network Temporary Identifier (C-RNTI) or some other unique identifier assigned to UE 116. This may allow UE 116 to unambiguously ascertain whether it is the intended recipient of a given data frame. In one design, eNB 100 may generate a cyclic redundancy check (CRC) for a data frame, then mask the CRC with the C-RNTI of UE 116, then append the UE-specific CRC to the data frame, and then send the data frame and the UE-specific CRC to UE 116. In another design, eNB 100 may scramble the data frame with the C-RNTI of UE 116 and then send the scrambled frame to UE 116.

For both the downlink and uplink, eNB 100 may send resource assignments to UE 116 using the C-RNTI of UE 116. This may allow UE 116 to unambiguously ascertain whether it is the intended recipient of a given resource assignment. In one design, eNB 100 may generate a CRC for a message carrying a resource assignment for UE 116, then mask the CRC with the C-RNTI of UE 116, then append the UE-specific CRC to the message, and then send the message and the UE-specific CRC to UE 116. In another design, eNB 100 may mask the message based on the C-RNTI of UE 116 and then send the masked message to UE 116. Resource assignments may also be sent in other manners such that (i) these assignments can be reliably received by the recipient UEs and (ii) errors in swapping resources between UEs can be reduced.

For both the downlink and uplink, eNB 100 may send messages to override a pending semi-persistent resource assignment. For example, in each subframe covered by the semi-persistent resource assignment, eNB 100 may send a message indicating the resources and/or MCS to use for that subframe, which may be different from the preconfigured resources and MCSs. UE 116 may operate based on the preconfigured resources and MCSs unless these parameters are overridden by messages from eNB 100.

For the downlink, multiple UEs may have a common downlink resource assignment of downlink resources to monitor for possible data transmission sent by eNB 100 to these UEs. eNB 100 may send data to any one of the UEs on the assigned downlink resources at any given moment. These UEs may attempt to decode their received transmissions from the assigned downlink resources and may send ACKs/NAKs on the same uplink signaling resources associated with the downlink resources. Each UE may send its ACK or NAK using on-off keying (OOK) in order to combat collisions of the ACKs/NAKs from different UEs. In one design, an ACK may be sent as 1 (or "on") and a NAK may be sent as 0 (or "off"). This design allows eNB 100 to correctly detect an ACK sent by a recipient UE of a data transmission sent on the assigned downlink resources in the presence of NAKs sent by non-recipient UEs of the data transmission.

For the downlink, UE 116 may be assigned a persistent resource assignment, and data may be sent to UE 116 without the use of a control channel. The persistent resource assignment may indicate preconfigured downlink resources and MCSs for UE 116. The preconfigured downlink resources may comprise a limited set of downlink resources where UE 116 might receive data. The preconfigured MCSs may comprise a limited set of MCSs that might be used to send data to UE 116. UE 116 may blindly decode the downlink transmission based on all possible combinations of preconfigured downlink resources and MCSs. eNB 100 may send data frames to UE 116 using the C-RNTI of the UE. This may allow UE 116 to determine that these data frames are sent to the UE and may also allow other UEs to determine that the data frames are not intended for them. UE 116 and other UEs may send ACKs/NAKs using OOK to combat collisions due to common downlink resource assignment.

FIG. 5 shows a design of a process 500 for exchanging data in a wireless communication system. Process 500 may be performed by a UE, a base station (e.g., an eNB), or some other entity. A resource assignment for a communication link may be determined, with the resource assignment being valid for as long as more data is sent within a predetermined time period of last sent data (block 512). The resource assignment may comprise resources and one or more modulation and coding schemes usable for data transmission via the communication link. Data may be exchanged (e.g., sent and/or received) via the communication link based on the resource assignment (block 514). The resource assignment may be relinquished upon determining that more data has not been exchanged within the predetermined time period from when data was last exchanged (block 516).

Process 500 may be performed by a UE for data transmission on the uplink. The UE may receive data to send on the uplink (e.g., from a VoIP application), send a request for resources in response to receiving the data to send, and receive the resource assignment in response to the request. The UE may then send the data based on the resource assignment, set a timer to the predetermined time period after sending the data, send more data if available and if the timer has not expired, reset the timer after sending more data, and relinquish the resource assignment when the timer expires. The UE may send a request with no data indication to terminate the resource assignment prior to expiration of the timer. The UE may send this request with no data indication (i) along with expected last data for the current data spurt, or (ii) if more data has not been sent within a particular time period of the last sent data, or (iii) based on some other condition or trigger event.

Process 500 may also be performed by a base station for data transmission on the uplink. The base station may receive a request for resources from the UE and may send the resource assignment to the UE. The base station may perform blind decoding of its received transmission based on the resource assignment to detect for data sent on the uplink by the UE.

Process 500 may also be performed by the base station for data transmission on the downlink. The base station may receive data to send on the downlink to the UE, determine the resource assignment based on the received data, and send the resource assignment to the UE. The base station may process the data based on a C-RNTI of the UE and may send the processed data on the downlink to the UE.

Process 500 may also be performed by the UE for data transmission on the downlink. The UE may monitor a control channel to receive the resource assignment. The UE may operate in a DRX mode and may monitor the control channel in designated time intervals to receive the resource assignment. The UE may perform blind decoding of its received transmission based on the resource assignment to detect for data sent on the downlink to the UE. The UE may receive data on the downlink based on the resource assignment and may send an ACK or a NAK for the received data using OOK.

For both the downlink and uplink, data may be sent in data frames with HARQ. Each data frame may be sent with at least one HARQ transmission, one HARQ transmission for the first transmission of the data frame and possibly additional HARQ transmissions for retransmissions of the data frame. The expected number of HARQ transmissions for each data frame may be shorter than the expected time interval between consecutive data frames in order to avoid buildup of the data buffer. If the resource assignment covers only the first HARQ transmission for each data frame, then the expected number of HARQ transmissions for each data frame may be between one and two in order to reduce signaling overhead for retransmissions.

FIG. 6 shows a design of an apparatus 600 for exchanging data in a wireless communication system. Apparatus 600 includes means for determining a resource assignment for a communication link, with the resource assignment being valid for as long as more data is sent within a predetermined time period of last sent data (module 612), means for exchanging data via the communication link based on the resource assignment (module 614), and means for relinquishing the resource assignment upon determining that more data has not been exchanged within the predetermined time period from when data was last exchanged (module 616).

FIG. 7 shows a design of a process 700 for sending data on the uplink by a UE. The UE may receive data to send on the uplink, e.g., from a VoIP application (block 712) and may send a request for resources in response to receiving the data to send (block 714). The UE may receive a resource assignment for the uplink, with the resource assignment being valid for as long as more data is sent within a predetermined time period of last sent data (block 716). The UE may send the data on the uplink based on the resource assignment (block 718). The UE may set a timer to the predetermined time period after sending the data on the uplink (block 720). The UE may send more data on the uplink if available and if the timer has not expired (block 722). The UE may relinquish the resource assignment when the timer expires (block 724).

FIG. 8 shows a design of an apparatus 800 for sending data on the uplink. Apparatus 800 includes means for receiving data to send on the uplink at a UE, e.g., from a VoIP application (module 812), means for sending a request for resources in response to receiving the data to send (module 814), means for receiving a resource assignment for the uplink, with the resource assignment being valid for as long as more data is sent within a predetermined time period of last sent data (module 816), means for sending the data on the uplink based on the resource assignment (module 818), means for setting a timer to the predetermined time period after sending the data on the uplink (module 820), means for sending more data on the uplink if available and if the timer has not expired (module 822), and means for relinquishing the resource assignment when the timer expires (module 824).

FIG. 9 shows a design of a process 900 for exchanging data in a wireless communication system. Process 900 may be performed by a UE, a base station, or some other entity. A semi-persistent resource assignment or a non-persistent resource assignment for a communication link may be determined (block 912). The semi-persistent resource assignment may be valid for as long as more data is sent within a predetermined time period of last sent data. The semi-persistent resource assignment may be granted for an expected spurt of data to send via the communication link. The non-persistent resource assignment may be valid for a predetermined duration or a specific transmission. Data may be exchanged via the communication link based on the semi-persistent or non-persistent resource assignment (block 914).

Process 900 may be performed by a UE for data transmission on the uplink. The UE may receive data to send on the uplink, e.g., from a VoIP application, and may send a request for resources. The UE may receive the semi-persistent resource assignment if the request is for a voice frame and may receive the non-persistent resource assignment if the request is for a SID frame. The UE may send a first codeword on a control channel if the request is for a voice frame and may send a second codeword on the control channel if the request is for a SID frame.

Process 900 may also be performed by a base station for data transmission on the uplink. The base station may receive a request for resources from the UE. The base station may send the semi-persistent resource assignment to the UE if the request is for a voice frame and may send the non-persistent resource assignment to the UE if the request is for a SID frame.

Process 900 may also be performed by the base station for data transmission on the downlink. The base station may send the semi-persistent resource assignment to the UE if there is a voice frame to send to the UE and may send the non-persistent resource assignment to the UE if there is a SID frame to send to the UE.

Process 900 may also be performed by the UE for data transmission on the downlink. The UE may monitor a control channel to receive the semi-persistent or non-persistent resource assignment for the downlink.

If the semi-persistent resource assignment is determined in block 912, then the UE and the base station may exchange data as described above for FIG. 5. If the non-persistent resource assignment is determined in block 912, then the UE and the base station may exchange data (e.g., a SID frame) and may relinquish the resource assignment right after the data exchange.

FIG. 10 shows a design of an apparatus 1000 for exchanging data in a wireless communication system. Apparatus 1000 includes means for determining a semi-persistent resource assignment or a non-persistent resource assignment for a communication link, with the semi-persistent resource assignment being valid for as long as more data is sent within a predetermined time period of last sent data, and the non-persistent resource assignment being valid for a predetermined duration or a specific transmission (module 1012), and means for exchanging data via the communication link based on the semi-persistent or non-persistent resource assignment (module 1014).

The modules in FIGS. 6, 8 and 10 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to determine a resource assignment for a communication link and to exchange traffic data via the communication link based on the resource assignment, the resource assignment being valid for as long as more traffic data is sent within a predetermined time period of last sent traffic data, wherein data is sent in frames with hybrid automatic retransmission, and wherein an expected number of hybrid automatic retransmissions for each frame is shorter than an expected time interval between consecutive frames; and
a memory coupled to the at least one processor.

2. The apparatus of claim 1, wherein the at least one processor is configured to relinquish the resource assignment upon determining that more data has not been exchanged within the predetermined time period from when data was last exchanged.

3. The apparatus of claim 1, wherein the communication link is an uplink, and wherein the at least one processor is configured to receive data to send on the uplink at a user equipment, to send a request for resources in response to receiving the data to send, and to receive the resource assignment in response to the request.

4. The apparatus of claim 3, wherein the at least one processor is configured to send the data based on the resource assignment, to set a timer to the predetermined time period after sending the data, to send more data if available and if the timer has not expired, to reset the timer to the predetermined time period after sending more data, and to relinquish the resource assignment when the timer expires.

5. The apparatus of claim 3, wherein the at least one processor is configured to send a request with no data indication to terminate the resource assignment prior to expiration of the predetermined time period.

6. The apparatus of claim 5, wherein the at least one processor is configured to send the request with no data indication along with expected last data or if more data has not been sent within a particular time period of last sent data.

7. The apparatus of claim 1, wherein the communication link is an uplink, and wherein the at least one processor is configured to receive a request for resources for the uplink from a user equipment and to send the resource assignment to the user equipment in response to the request.

8. The apparatus of claim 7, wherein the at least one processor is configured to perform blind decoding of received transmission based on the resource assignment to detect for data sent on the uplink by the user equipment.

9. The apparatus of claim 1, wherein the communication link is a downlink, and wherein the at least one processor is configured to receive data to send on the downlink to a user equipment, to determine the resource assignment for the user equipment based on the received data, and to send the resource assignment to the user equipment.

10. The apparatus of claim 9, wherein the at least one processor is configured to process the received data based on a cell radio network temporary identifier of the user equipment, and to send the processed data on the downlink to the user equipment.

11. The apparatus of claim 1, wherein the communication link is a downlink, and wherein the at least one processor is configured to monitor a control channel to receive the resource assignment for a user equipment.

12. The apparatus of claim 11, wherein the at least one processor is configured to operate in a discontinuous reception mode and to monitor the control channel in designated time intervals to receive the resource assignment.

13. The apparatus of claim 11, wherein the at least one processor is configured to perform blind decoding of received transmission based on the resource assignment to detect for data sent on the downlink to the user equipment.

14. The apparatus of claim 11, wherein the at least one processor is configured to receive data on the downlink based on the resource assignment and to send an acknowledgement or a negative acknowledgement for the received data using on-off keying.

15. The apparatus of claim 1, wherein each frame is sent with at least one hybrid automatic retransmission.

16. The apparatus of claim 15, wherein the resource assignment covers one hybrid automatic retransmission for each frame, and wherein the expected number of hybrid automatic retransmissions for each frame is between one and two.

17. A method for wireless communication, comprising:
determining a resource assignment for a communication link, the resource assignment being valid for as long as more traffic data is sent within a predetermined time period of last sent traffic data, wherein data is sent in frames with hybrid automatic retransmission, and wherein an expected number of hybrid automatic retransmissions for each frame is shorter than an expected time interval between consecutive frames; and
exchanging traffic data via the communication link based on the resource assignment.

18. The method of claim 17, wherein the communication link is an uplink, and wherein the determining the resource assignment comprises
receiving data to send on the uplink at a user equipment,
sending a request for resources in response to receiving the data to send, and
receiving the resource assignment in response to the request.

19. The method of claim 17, wherein the exchanging data via the communication link comprises
performing blind decoding of received transmission based on the resource assignment to detect for data sent via the communication link.

20. The method of claim 17, wherein the exchanging data via the communication link comprises
processing data based on a cell radio network temporary identifier of a user equipment, and
sending the processed data via the communication link.

21. The method of claim 17, wherein the exchanging data via the communication link comprises
receiving data via the communication link based on the resource assignment, and
sending an acknowledgement or a negative acknowledgement for the received data using on-off keying.

22. An apparatus for wireless communication, comprising:
means for determining a resource assignment for a communication link, the resource assignment being valid for as long as more traffic data is sent within a predetermined time period of last sent traffic data, wherein data is sent in frames with hybrid automatic retransmission, and wherein an expected number of hybrid automatic retransmissions for each frame is shorter than an expected time interval between consecutive frames; and
means for exchanging traffic data via the communication link based on the resource assignment.

23. The apparatus of claim 22, wherein the communication link is an uplink, and wherein the means for determining the resource assignment comprises
means for receiving data to send on the uplink at a user equipment,
means for sending a request for resources in response to receiving the data to send, and
means for receiving the resource assignment in response to the request.

24. The apparatus of claim 22, wherein the means for exchanging data via the communication link comprises
means for performing blind decoding of received transmission based on the resource assignment to detect for data sent via the communication link.

25. The apparatus of claim 22, wherein the means for exchanging data via the communication link comprises
means for processing data based on a cell radio network temporary identifier of a user equipment, and
means for sending the processed data via the communication link.

26. The apparatus of claim 22, wherein the means for exchanging data via the communication link comprises
means for receiving data via the communication link based on the resource assignment, and
means for sending an acknowledgement or a negative acknowledgement for the received data using on-off keying.

27. A non-transitory machine-readable medium comprising instructions which, when executed by a machine, cause the machine to perform operations including:
determining a resource assignment for a communication link, the resource assignment being valid for as long as more traffic data is sent within a predetermined time period of last sent traffic data, wherein data is sent in frames with hybrid automatic retransmission, and wherein an expected number of hybrid automatic retransmissions for each frame is shorter than an expected time interval between consecutive frames; and
exchanging traffic data via the communication link based on the resource assignment.

28. The non-transitory machine-readable medium of claim 27 which, when executed by the machine, cause the machine to perform operations further including:
receiving data to send on an uplink at a user equipment;
sending a request for resources in response to receiving the data to send; and
receiving the resource assignment in response to the request.

29. The non-transitory machine-readable medium of claim 27 which, when executed by the machine, cause the machine to perform operations further including:
performing blind decoding of received transmission based on the resource assignment to detect for data sent via the communication link.

30. The non-transitory machine-readable medium of claim 27 which, when executed by the machine, cause the machine to perform operations further including:
processing data based on a cell radio network temporary identifier of a user equipment, and
sending the processed data via the communication link.

31. The non-transitory machine-readable medium of claim 27 which, when executed by the machine, cause the machine to perform operations further including:
receiving data via the communication link based on the resource assignment; and
sending an acknowledgement or a negative acknowledgement for the received data using on-off keying.

32. An apparatus for wireless communication, comprising:
at least one processor configured to receive traffic data to send on uplink at a user equipment, to send a request for resources in response to receiving the traffic data to send, to receive a resource assignment for the uplink, and to send the traffic data on the uplink based on the resource assignment, the resource assignment being valid for as long as more traffic data is sent within a predetermined time period of last sent traffic data, wherein data is sent in frames with hybrid automatic retransmission, and wherein an expected number of hybrid automatic retransmissions for each frame is shorter than an expected time interval between consecutive frames; and
a memory coupled to the at least one processor.

33. The apparatus of claim 32, wherein the at least one processor is configured to set a timer to the predetermined time period after sending the data on the uplink, to send more data on the uplink if available and if the timer has not expired, and to relinquish the resource assignment when the timer expires.

34. An apparatus for wireless communication, comprising:
at least one processor configured to determine a semi-persistent resource assignment or a non-persistent resource assignment for a communication link, and to exchange traffic data via the communication link based on the semi-persistent or non-persistent resource assignment, the semi-persistent resource assignment being valid for as long as more traffic data is sent within a predetermined time period of last sent traffic data, and the non-persistent resource assignment being valid for a predetermined duration or a specific transmission, wherein data is sent in frames with hybrid automatic retransmission, and wherein an expected number of hybrid automatic retransmissions for each frame is shorter than an expected time interval between consecutive frames; and
a memory coupled to the at least one processor.

35. The apparatus of claim 34, wherein the semi-persistent resource assignment is granted for an expected spurt of data to exchange via the communication link.

36. The apparatus of claim 34, wherein the communication link is an uplink, and wherein the at least one processor is configured to send a request for resources, to receive the semi-persistent resource assignment if the request for resources is for a voice frame, and to receive the non-persistent resource assignment if the request for resources is for a silence descriptor frame.

37. The apparatus of claim 36, wherein the at least one processor is configured to send a first codeword on a control channel if the request for resources is for a voice frame, and to send a second codeword on the control channel if the request for resources is for a silence descriptor frame.

38. The apparatus of claim 34, wherein the communication link is an uplink, and wherein the at least one processor is configured to receive a request for resources from a user equipment, to send the semi-persistent resource assignment to the user equipment if the request for resources is for a voice frame, and to send the non-persistent resource assignment to the user equipment if the request for resources is for a silence descriptor frame.

39. The apparatus of claim 34, wherein the communication link is a downlink, and wherein the at least one processor is configured to send the semi-persistent resource assignment to a user equipment if there is a voice frame to send to the user equipment, and to send the non-persistent resource assignment to the user equipment if there is a silence descriptor frame to send to the user equipment.

40. The apparatus of claim 34, wherein the communication link is a downlink, and wherein the at least one processor is configured to monitor a control channel to receive the semi-persistent or non-persistent resource assignment for the downlink.

41. A method for wireless communication, comprising:
determining a semi-persistent resource assignment or a non-persistent resource assignment for a communication link, the semi-persistent resource assignment being valid for as long as more traffic data is sent within a predetermined time period of last sent traffic data, the non-persistent resource assignment being valid for a predetermined duration or a specific transmission, wherein data is sent in frames with hybrid automatic retransmission, and wherein an expected number of hybrid automatic retransmissions for each frame is shorter than an expected time interval between consecutive frames; and
exchanging traffic data via the communication link based on the semi-persistent or non-persistent resource assignment.

42. The method of claim 41, wherein the communication link is an uplink, and wherein the determining the semi-persistent or non-persistent resource assignment comprises
sending a request for resources,
receiving the semi-persistent resource assignment if the request for resources is for a voice frame, and
receiving the non-persistent resource assignment if the request for resources is for a silence descriptor frame.

43. The method of claim 41, wherein the communication link is an uplink, and wherein the determining the semi-persistent or non-persistent resource assignment comprises
receiving a request for resources from a user equipment user equipment,
sending the semi-persistent resource assignment to the user equipment if the request for resources is for a voice frame, and sending the non-persistent resource assignment to the user equipment if the request for resources is for a silence descriptor frame.

44. An apparatus for wireless communication, comprising:
means for determining a semi-persistent resource assignment or a non-persistent resource assignment for a communication link, the semi-persistent resource assignment being valid for as long as more traffic data is sent within a predetermined time period of last sent traffic data, the non-persistent resource assignment being valid for a predetermined duration or a specific transmission, wherein data is sent in frames with hybrid automatic retransmission, and wherein an expected number of hybrid automatic retransmissions for each frame is shorter than an expected time interval between consecutive frames; and
means for exchanging traffic data via the communication link based on the semi-persistent or non-persistent resource assignment.

45. The apparatus of claim 44, wherein the communication link is an uplink, and wherein the means for determining the semi-persistent or non-persistent resource assignment comprises
means for sending a request for resources,
means for receiving the semi-persistent resource assignment if the request for resources is for a voice frame, and
means for receiving the non-persistent resource assignment if the request for resources is for a silence descriptor frame.

46. The apparatus of claim 44, wherein the communication link is an uplink, and wherein the means for determining the semi-persistent or non-persistent resource assignment comprises
means for receiving a request for resources from a user equipment,
means for sending the semi-persistent resource assignment to the user equipment if the request for resources is for a voice frame, and
means for sending the non-persistent resource assignment to the user equipment if the request for resources is for a silence descriptor frame.

47. An apparatus for wireless communication, comprising:
at least one processor configured to
determine a resource assignment for a communication link,
send data over the communications link based on the resource assignment,
set a timer to a predetermined time period after sending the data,
send additional data over the communications link if the timer has not expired,
reset the timer after sending the additional data, and
relinquish the resource assignment when the timer expires, wherein data is sent in frames with hybrid automatic retransmission, and wherein an expected number of hybrid automatic retransmissions for each frame is shorter than an expected time interval between consecutive frames; and
a memory coupled to the at least one processor.

48. The apparatus of claim 47, wherein the at least one processor is configured to send signaling to relinquish the resource assignment prior to the expiration of the predetermined time period.

49. An apparatus for wireless communication, comprising:
at least one processor configured to determine a resource assignment for a communication link and to exchange traffic data via the communication link based on the resource assignment, and further configured to relinquish the resource assignment when additional traffic data has not been exchanged during a predetermined time period starting from when traffic data was last exchanged, wherein the predetermined time period is a configurable value selected based upon a frame inter-arrival time, wherein data is sent in frames with hybrid automatic retransmission, and wherein an expected number of hybrid automatic retransmissions for each frame is shorter than an expected time interval between consecutive frames; and
a memory coupled to the at least one processor.

50. The apparatus of claim 49, wherein the at least one processor is further configured to send signaling to relinquish the resource assignment prior to the expiration of the predetermined time period.

51. A method for wireless communication, comprising:
determining a resource assignment for a communication link;
sending data over the communications link based on the resource assignment;
setting a timer to a predetermined time period after sending the data;
sending additional data over the communications link if the timer has not expired;
resetting the timer after sending the additional data; and
relinquishing the resource assignment when the timer expires, wherein data is sent in frames with hybrid automatic retransmission, and wherein an expected number of hybrid automatic retransmissions for each frame is shorter than an expected time interval between consecutive frames.

52. The method of claim 51, further comprising:
sending signaling to relinquish the resource assignment prior to the expiration of the predetermined time period.

53. A method for wireless communication, comprising:
determining a resource assignment for a communication link;
exchanging traffic data via the communication link based on the resource assignment; and
relinquishing the resource assignment when additional traffic data has not been exchanged during a predetermined time period starting from when traffic data was last exchanged, wherein the predetermined time period is a configurable value selected based upon a frame inter-arrival time, wherein data is sent in frames with hybrid automatic retransmission, and wherein an expected number of hybrid automatic retransmissions for each frame is shorter than an expected time interval between consecutive frames.

54. The method of claim 53, further comprising:
sending signaling to relinquish the resource assignment prior to the expiration of the predetermined time period.

55. An apparatus for wireless communication, comprising:
means for determining a resource assignment for a communication link;
means for sending data over the communications link based on the resource assignment;
means for setting a timer to a predetermined time period after sending the data;
means for sending additional data over the communications link if the timer has not expired;
means for resetting the timer after sending the additional data; and
means for relinquishing the resource assignment when the timer expires, wherein data is sent in frames with hybrid automatic retransmission, and wherein an expected number of hybrid automatic retransmissions for each frame is shorter than an expected time interval between consecutive frames.

56. The apparatus of claim 55, further comprising:
means for sending signaling to relinquish the resource assignment prior to the expiration of the predetermined time period.

57. An apparatus for wireless communication, comprising:
means for determining a resource assignment for a communication link;
means for exchanging traffic data via the communication link based on the resource assignment; and
means for relinquishing the resource assignment when additional traffic data has not been exchanged during a predetermined time period starting from when traffic data was last exchanged, wherein the predetermined time period is a configurable value selected based upon a frame inter-arrival time, wherein data is sent in frames with hybrid automatic retransmission, and wherein an expected number of hybrid automatic retransmissions for each frame is shorter than an expected time interval between consecutive frames.

58. The apparatus of claim 57, further comprising:
means for sending signaling to relinquish the resource assignment prior to the expiration of the predetermined time period.

59. A non-transitory computer readable medium comprising instructions for causing a processor to execute a method, the method comprising:
determining a resource assignment for a communication link;
sending data over the communications link based on the resource assignment;
setting a timer to a predetermined time period after sending the data;
sending additional data over the communications link if the timer has not expired;
resetting the timer after sending the additional data; and
relinquishing the resource assignment when the timer expires, wherein data is sent in frames with hybrid automatic retransmission, and wherein an expected number of hybrid automatic retransmissions for each frame is shorter than an expected time interval between consecutive frames.

60. The non-transitory computer readable medium of claim 59, wherein the method further comprises:
sending signaling to relinquish the resource assignment prior to the expiration of the predetermined time period.

61. A non-transitory computer readable medium comprising instructions for causing a processor to execute a method, the method comprising:
determining a resource assignment for a communication link;
exchanging traffic data via the communication link based on the resource assignment; and
relinquishing the resource assignment when additional traffic data has not been exchanged during a predetermined time period starting from when traffic data was last exchanged, wherein the predetermined time period is a configurable value selected based upon a frame inter-arrival time, wherein data is sent in frames with hybrid automatic retransmission, and wherein an expected number of hybrid automatic retransmissions for each frame is shorter than an expected time interval between consecutive frames.

62. The non-transitory computer readable medium of claim 61, wherein the method further comprises:
sending signaling to relinquish the resource assignment prior to the expiration of the predetermined time period.

63. The apparatus of claim 1, wherein the predetermined time period corresponds to a fixed amount of time between sending traffic data transmissions.

64. The apparatus of claim 1, wherein the resource assignment is valid only for as long as more traffic data is sent within a predetermined time period of last sent traffic data.

65. The apparatus of claim 47, wherein the apparatus is a user equipment (UE), and wherein the communications link is an uplink for carrying data from the UE to a base station.

66. The apparatus of claim 47, wherein the at least one processor is configured to set the timer to the predetermined time period in response to the sending of the data.

67. The apparatus of claim 47, wherein the at least one processor is configured to relinquish the resource assignment immediately when the timer expires.

* * * * *